No. 637,173. Patented Nov. 14, 1899.
U. P. SMITH.
DETACHABLE TIRE FOR BICYCLES.
(Application filed Apr. 17, 1899.)
(No Model.) 2 Sheets—Sheet 1.
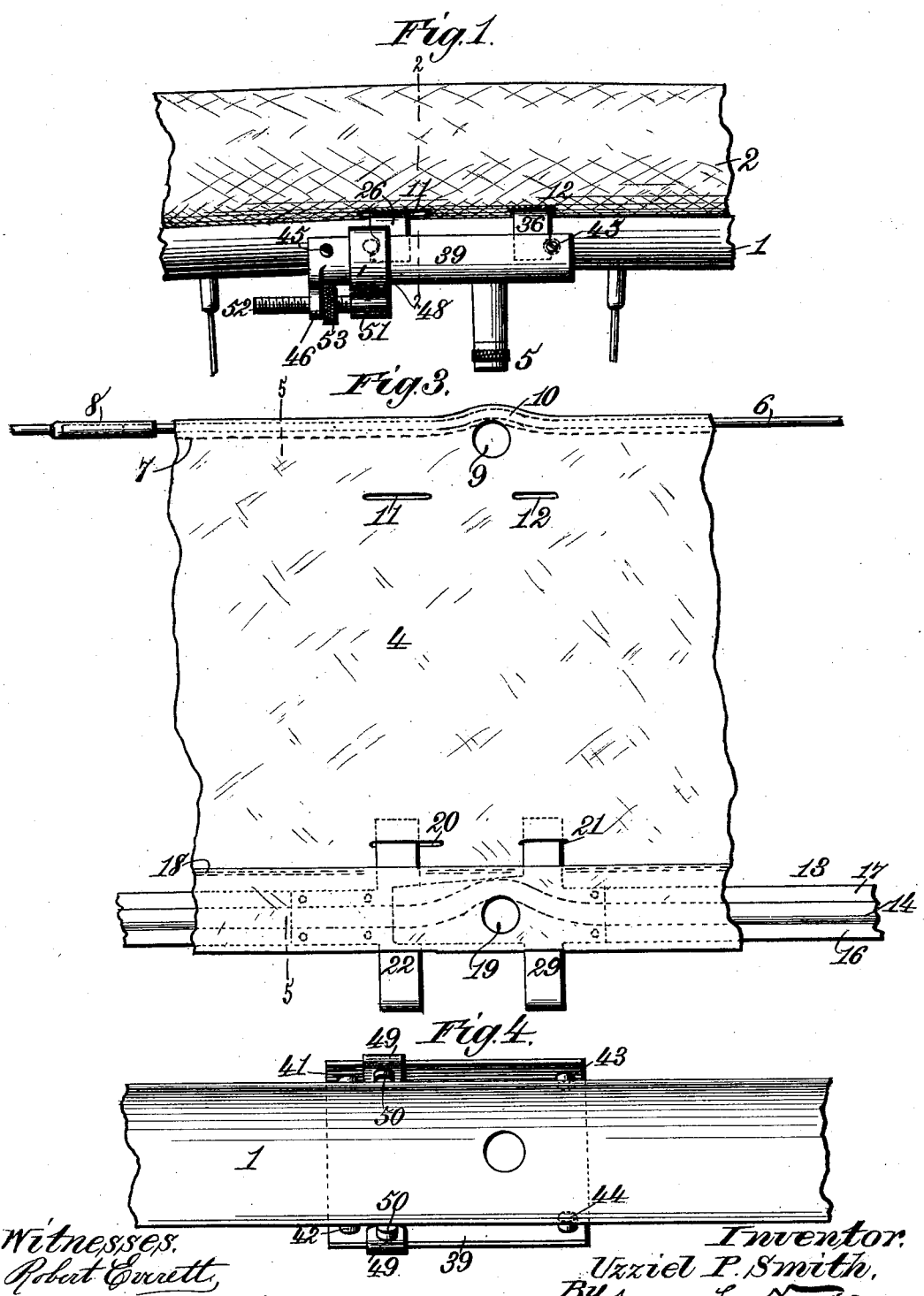

No. 637,173. Patented Nov. 14, 1899.
U. P. SMITH.
DETACHABLE TIRE FOR BICYCLES.
(Application filed Apr. 17, 1899.)
(No Model.) 2 Sheets—Sheet 2.
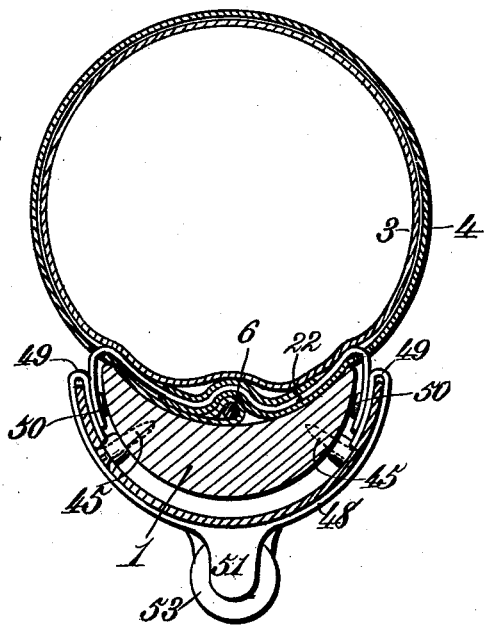
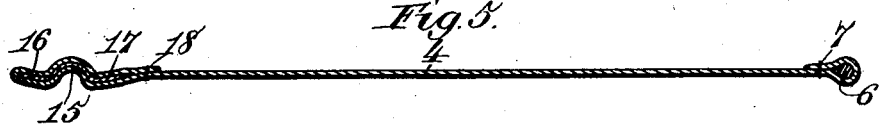
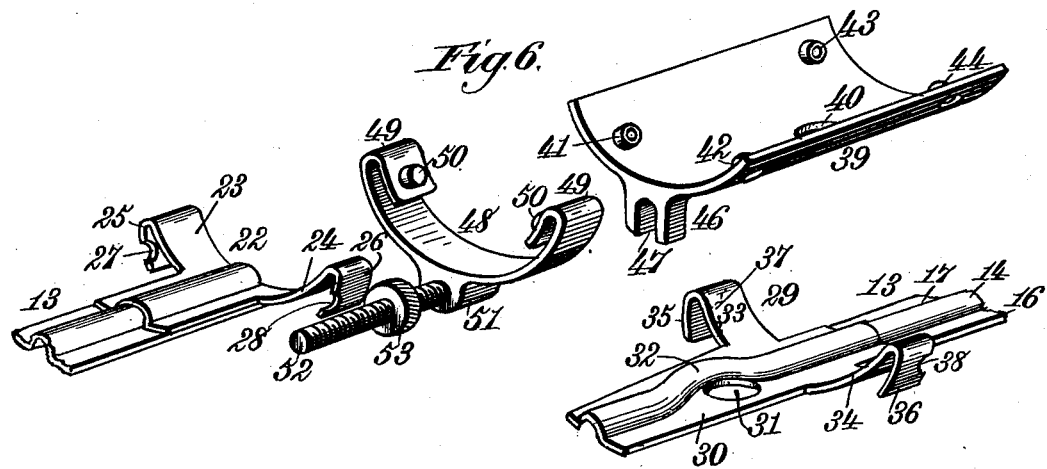
Witnesses.
Robert Everett,
Dennis Sumby.
Inventor,
Uzziel P. Smith.
By James L. Norris.
Atty.

UNITED STATES PATENT OFFICE.

UZZIEL P. SMITH, OF CHICAGO, ILLINOIS.

DETACHABLE TIRE FOR BICYCLES.

SPECIFICATION forming part of Letters Patent No. 637,173, dated November 14, 1899.

Application filed April 17, 1899. Serial No. 713,314. (No model.)

*To all whom it may concern:*

Be it known that I, UZZIEL P. SMITH, a citizen of the United States, residing at Chicago, in the county of Cook and State of Illinois, have invented new and useful Improvements in Detachable Tires for Bicycles or other Vehicles, of which the following is a specification.

My invention relates to improvements in detachable tires for bicycles or other vehicles.

My invention has reference to improvements in that class of tires known as "clencher-tires," and has for its object the provision of novel means connected with the outer sheath or casing of the tire for holding said casing upon the rim and for securing the inner air-tube within the casing.

A further object of the invention relates to the provision of novel means operatively connected with an adjustable retaining-band secured in one edge of the outer casing or sheath for adjusting said band and holding it in the adjusted position.

Other objects of the invention relate to certain details of construction and operation of parts, which will more clearly appear hereinafter.

I have illustrated my invention in the accompanying drawings, in which—

Figure 1 is a side elevation of a portion of a rim and tire, showing my improved adjusting means applied thereto. Fig. 2 is section on the line 2 2 of Fig. 1. Fig. 3 a view of the inside of a portion of an outer sheath or casing, showing my improved retaining means applied thereto, said sheath or casing being flattened or unrolled. Fig. 4 is a view of the inside of that portion of a rim having my adjusting means secured thereto, the view being arranged relative to Fig. 3. Fig. 5 is a section through the sheath or casing, taken on the line 5 5 of Fig. 3; and Fig. 6 represents detached perspective views of my invention.

Referring to the drawings, the reference-numeral 1 indicates the rim of a wheel, and 2 a tire secured thereon according to my invention. Said tire, as usual, comprises an inner air-tube 3 and an outer casing or sheath 4.

The numeral 5 indicates the inflating-valve attached to the air-tube 3, said valve being of the ordinary or any preferred construction.

Secured along one edge of the casing 4 is an extensible wire ring 6, said wire ring being retained in the casing by doubling the canvas thereof about said ring and then stitching the two thicknesses of canvas together adjacent to the wire, as shown at 7 in Fig. 5. The wire ring 6 is made extensible by having one end of the wire inserted and movable in a tubular socket 8, carried by the opposite end. Near the edge of the casing is provided a circular opening 9, through which the valve 5 is designed to pass, and the wire ring 6 is bent laterally outward at this point, as indicated at 10, so that it will pass around the valve when the parts are assembled. Adjacent to the edge of the casing in which the ring 6 is secured, but farther removed from said edge than the opening 9, I provide two slits or elongated apertures 11 12, which are in line with each other, the aperture 11 being longer than the aperture 12 for a purpose to be presently explained. In the opposite edge of the casing I secure my improved retaining-band 13, which is formed of a flat metal band curved, arched, or otherwise bent upward throughout its longitudinal center, as indicated at 14, to provide a continuous recess or seat 15 for the ring 6, as presently described, and having its sides 16 17 adjacent to such arched portion 14 slightly curved upward, so that the band 13 will fit snugly and firmly in the concave of the rim. I secure this band in the edge of the casing by doubling the canvas thereof about said band and stitching the two thicknesses of canvas together adjacent to the band, as indicated at 18 in Fig. 5. The side of the casing containing the band 13 is also provided with an opening 19 for the air-valve 5 and with two elongated apertures 20 21, corresponding, respectively, with the apertures 11 12. Secured on one end of the band 13 by rivets or otherwise is a metal clip 22, which conforms to the configuration of the band and at its outer end is provided with two arms 23 24, formed integral with said clip and extending from opposite sides thereof, said arms being curved to conform to the curvature of the rim. At their outer ends these arms are curved downward to form ears 25 26, in the inner edge of each of which is provided a recess or socket 27 28, respectively. The curved ends of the arms 23 24 are adapted to embrace opposite edges of the rim, as will presently appear. Secured on the opposite end of the band 13 by rivets or otherwise is a metal clip 29, conforming in configuration to the band 13 and projecting outward from the end thereof, said projecting portion 30 being adapted to lie under the opposite end of the band 13 when the latter is placed in position on the rim. The clip 29 is provided with an opening 31 for the passage therethrough of the valve 5, and the arch or corrugation 14 extends in a curve about this opening, as indicated at 32. When the parts are in position on the rim, the curved portion 10 of the ring 6 will seat in or under the curved portion 32 of the clip 29. At its inner end the clip 29 is provided with two arms 33 34, which are integral with the clip and extend from opposite sides thereof, said arms being curved upward to conform to the curvature of the rim. At their outer ends these arms are curved downward to provide ears 35 36, which are adapted to fit over opposite edges of the rim in the same manner as the ears 25 26. Each of the ears 35 36 is likewise provided on its inner edge with a recess, said recesses being denoted, respectively, by the numerals 37 38. Secured on the under side of the rim is a curved plate 39, having an opening 40 for the passage therethrough of the air-valve. At opposite inner sides and near each end this plate is provided with apertured lugs 41 42 43 44, which rest against the under side of the rim and hold the plate 39 out of contact therewith, and through the apertures in which lugs pass the screws 45, which secure the plate 39 to the rim. At one end on its under side said plate is provided with a lug 46, having a recess 47.

The numeral 48 indicates a slide-plate, which is fitted on the plate 39 in a manner to permit it to be moved back and forth thereon. To this end said slide-plate is curved to conform to the curvature of the plate 39, and its ends are further bent or curved inward and downward, as indicated at 49, to embrace opposite edges of said plate and to form a sliding contact therewith. Each of these curved ends is provided on its outer side with a lug 50. On the bottom of the slide-plate 48 is an integral lug 51, secured in which and projecting outward therefrom is a screw-threaded bolt 52, on which is a thumb-nut 53.

Referring to Figs. 2 and 3, it will be seen that the arms 23 and 33 project through the envelop inclosing the band 13 and also through the respective apertures 20 and 21 in the casing.

The parts are assembled as follows: The air-tube 3 is placed in the casing, the valve 5 being inserted through the opening 19 therein and the coincident aperture 31 in clip 29. The casing 4 is now made to inclose the tube, for this purpose the edge of the casing containing the ring 6 being brought over and carried under the band 13, so that said ring lies immediately under the longitudinal recess or seat 15, formed by the arch or corrugation 14. In thus manipulating the casing the apertures 11 and 12 will be passed over the respective arms 24 and 34 and the opening 9 over the valve 5. The tire is now applied to the rim, which may be readily done owing to the fact that the circumference of band 13 and of ring 6 may be increased at will. The location and arrangement of parts is such that when the tire is in position on the rim the recesses 37 and 38 in the ears 35 and 36 may be made to engage behind the respective lugs 43 and 44 on the inner side of the plate 39, while the recesses 27 and 28 in the ears 25 and 26 are made to engage behind the lugs 50 on the slide-plate 48. The bolt 52, when said slide-plate is in position on plate 39, works in the recess 47, and the nut 53 normally engages the lug 46. By turning this nut, therefore, the slide-plate 48 can be moved in a direction away from the lug 46, whereby through the engagement of lugs 50 with the ears of clip 22 said clip, with the end of band 13 to which it is attached, may be drawn inward or toward the opposite end of the band, and as the clip 29 is held stationary by engagement of its ears with the lugs 43 44 it follows that the band 13 will be drawn firmly about the rim, the position of the parts when the tire is inflated being shown in Fig. 2. It will be seen that the ring 6 will be held securely within the recess 15, and the broad bearing-surface afforded by the sides 16 17 of the band 13 will operate to hold the tire firmly to its seat at both sides of the rim. In the movement of the clip 22 the arms 23 and 24 will slide in the elongated apertures 11 and 20 of the casing, as will be understood. To remove the tire, the nut 53 is turned so that the slide-plate 48 can be moved toward the lug 46 to increase the circumference of band 13 sufficiently to permit it to be passed over the edge of the rim.

It will be seen that my invention is simple and economical in construction and will permit of a tire being quickly attached to or removed from a rim and that when on the rim the tire is firmly held to its seat at both sides.

Having thus fully described my invention, what I claim as new is—

1. In a pneumatic tire, an outer casing having a ring secured in one edge and an adjustable retaining-band secured in its opposite edge, said band having a longitudinal seat or concave extending throughout its length and adapted to receive said ring, substantially as described.

2. In a pneumatic tire, an outer casing having a ring secured in one edge and an adjustable retaining-band secured in its opposite edge, said band having a longitudinal seat or concave extending throughout its length and adapted to receive said ring and side extensions forming bearing-surfaces, substantially as described.

3. In a pneumatic tire, an outer casing having an extensible ring secured in one edge and an adjustable retaining-band secured in its opposite edge, said band having a longitudinal seat or concave extending throughout its length and adapted to receive said ring, and means for adjusting said band, substantially as described.

4. In a pneumatic tire, in combination with a rim having a tire-seat, an outer casing having in one edge a ring adapted to seat therein and in its opposite edge a retaining-band having a central longitudinal seat or concave adapted to receive said ring when the band is placed over the same, and means for clamping said band upon the rim to hold said ring securely within said concave, substantially as described.

5. In a pneumatic tire, in combination with a rim having a tire-seat, an outer casing having in one edge a ring adapted to seat therein and in its opposite edge a retaining-band having a central longitudinal seat or concave adapted to receive said ring when the band is placed over the same and side extensions forming bearing-surfaces, and means for clamping said band upon the rim to hold said ring securely within said concave and to hold the tire to the rim firmly at each side of the seat, substantially as described.

6. In a pneumatic clencher-tire, in combination with a rim, a retaining-band having at its meeting ends arms projecting over the rim at each side thereof, means for holding one set of arms stationary and means for adjusting the other set of arms relative to the first, substantially as described.

7. In a pneumatic clencher-tire, in combination with a rim, a plate secured thereon having stops, a retaining-band having at its meeting ends arms projecting over the rim at each side thereof, one set of arms engaging said stops, a slide mounted on said plate and engaging the other set of arms and means for adjusting said slide.

8. In a pneumatic clencher-tire, in combination with a rim, a plate secured thereon having stops and provided at one end with a recessed lug, a retaining-band having at its meeting ends, arms projecting over the rim at each side thereof, one set of arms engaging said stops, a slide mounted on said plate and engaging the other set of arms, a screw carried by said slide and working in the recess of said lug and a nut on said screw engaging with said lug, substantially as described.

9. In a pneumatic clencher-tire, in combination with a rim, a plate secured thereon having stops and provided at one end with a recessed lug, a retaining-band having at its meeting ends arms projecting over the rim at each side thereof and recessed on their inner sides, the recesses in one set of arms engaging said stops, a slide mounted on said plate and having its ends curved over opposite side edges thereof and provided with stops engaging the recesses in the other set of arms, a screw carried by said slide and working in the recess of said lug and a nut on said screw engaging with said lug, substantially as described.

In testimony whereof I have hereunto set my hand in presence of two subscribing witnesses.

UZZIEL P. SMITH.

Witnesses:
GEO. W. REA,
BRUCE S. ELLIOTT.